A. L. ROMERO.
WEED PULLER.
APPLICATION FILED APR. 26, 1918.
1,292,376.
Patented Jan. 21, 1919.
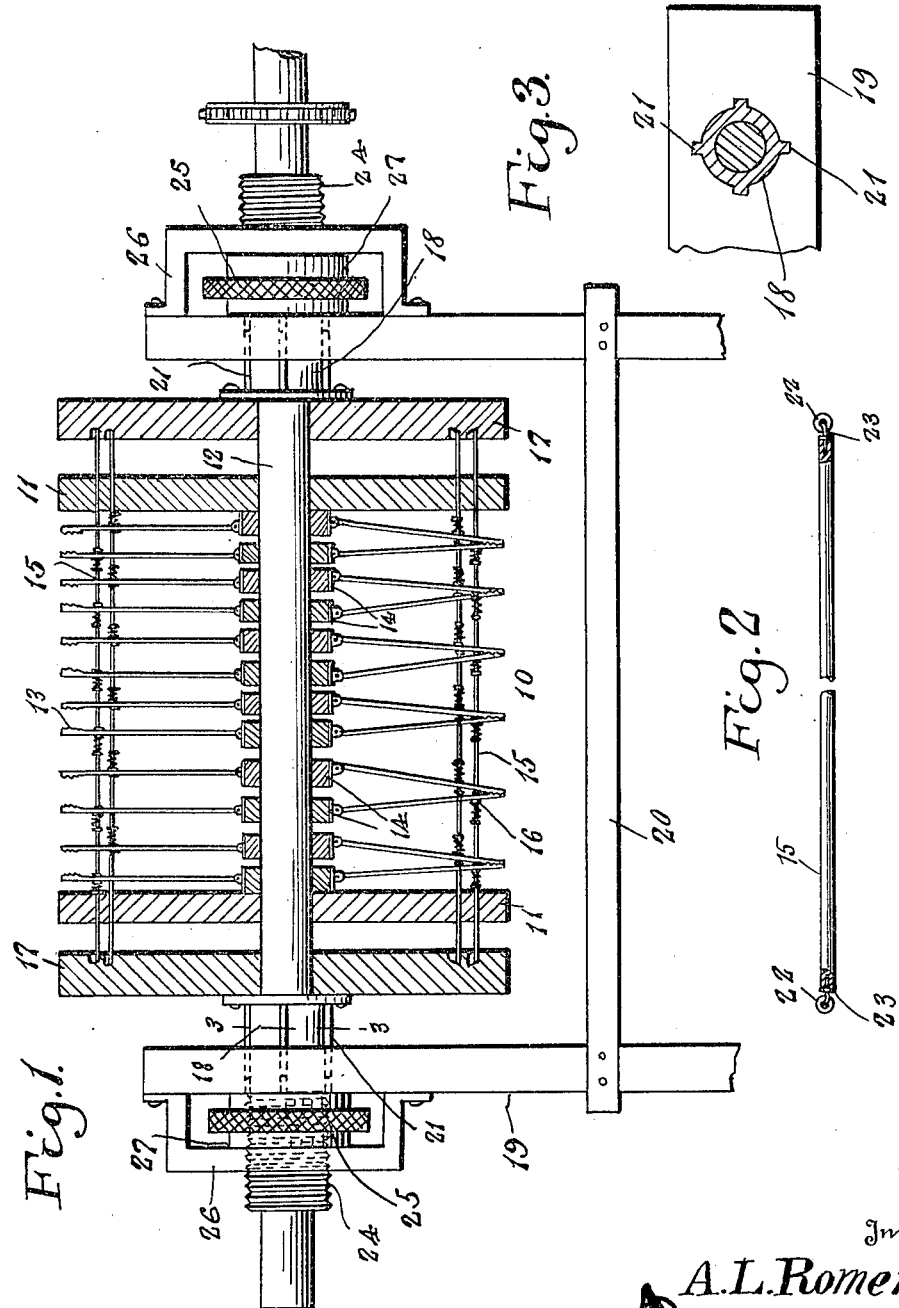

UNITED STATES PATENT OFFICE.

ALFREDO L. ROMERO, OF OAKLAND, CALIFORNIA.

WEED-PULLER.

1,292,376. Specification of Letters Patent. Patented Jan. 21, 1919.

Application filed April 26, 1918. Serial No. 230,927.

*To all whom it may concern:*

Be it known that I, ALFREDO L. ROMERO, a citizen of the United States, residing at Oakland, in the county of Alameda and State of California, have invented certain new and useful Improvements in Weed-Pullers; and I do hereby declare the following to be a full, clear, and exact description of the invention, such as will enable others skilled in the art to which it appertains to make and use the same.

The object of the invention is to provide simple and efficient means for compensating for wear upon the operating parts of a weed puller of the type indicated in my allowed application, filed July 13, 1917, Serial No. 180,425, to avoid the necessity of replacing parts after the machine has been used for a considerable length of time, the adjustment necessary to take up lost motion being possible even while the machine is in operation, so that it may be accomplished from time to time as the occasion arises, or as the action of the gripping elements may require.

Further objects and advantages will appear in the following description, it being understood that changes in form and proportion may be resorted to within the scope of the claims without departing from the spirit of the invention.

In the drawing:

Figure 1 is a sectional view of the gripping drum and related parts including the adjusting elements forming the subject-matter of this invention.

Fig. 2 is a detail view of the preferred form of gripper actuating rod.

Fig. 3 is a detail sectional view on the plane indicated by the line 3—3 of Fig. 1.

In the illustrated embodiment of the invention, the gripper drum 10 is provided with heads 11 carried by the shaft 12, gripper jaws or elements 13 pivotally mounted upon collars 14 secured to said shaft, and jaw actuating rods 15 having cushioned cappings 16 for contact respectively with the jaws to cause them to close at the proper time to grip the weeds as the drum rotates. These gripper actuating rods are operated by means of cams 17 provided with hubs 18 which are mounted for axial sliding movement in the uprights or supports 19, forming a part of the framework of the machine and rigidly connected and held in their proper positions by braces 20, of which of course any equivalent may be employed.

The hubs are provided with longitudinal guiding ribs 21, as shown clearly in Fig. 3, to engage corresponding seats in the supports 19, so that the hubs and cams are held positively against rotary movement or displacement while capable of longitudinal movement to vary the relation of the cam faces with respect to the terminals of the gripper actuating rods. Preferably, although not necessarily, the gripper rods may be provided with terminal anti-friction rollers 22 having, for example, shanks 23 mounted in suitable sockets in the extremities of the rods so that in operation the rollers have a swiveled action to accurately follow the cam grooves in the faces of the cams 17.

The hubs of the cams are also exteriorly threaded as shown at 24, and engaged with these threaded portions are the adjusting nuts 25 arranged in the yokes 26 which are secured to and carried by the supports 19, washers 27 being interposed between the nuts and said yokes and supports, respectively, so as to hold the nuts against axial movement while permitting rotation thereof to advance the hubs of the cams either inwardly or outwardly as may be required to secure the desired relation between the cam faces and the extremities of the gripper actuating rods.

Obviously, by reason of this construction and relative arrangement of parts, the required accuracy of movement of the gripper jaws may be secured, to the end that the durability of the mechanism is vastly increased. Also it will be obvious that the adjustment of the cams to take up lost motion or to compensate for wear may be accomplished while the machine is in operation, merely by turning the nuts to advance the cams inwardly relative to the operating shaft 12 and the heads 11 which are carried thereby and which in turn support the gripper actuating rods.

Having described the invention what is claimed is:

1. In a weed puller the combination with a rotary gripper drum having movable jaws and actuating rods for said jaws, of cams disposed in operative relation with the extremities of said actuating rods, and means for adjusting the cams axially with relation to the drum to vary the relation between the same and the extremities of the actuating rods.

2. In a weed puller the combination with a rotary gripper drum having gripper jaws and actuating rods for the same, of cams disposed in operative relation with said actuating rods and having hubs mounted for axial sliding movement parallel with the axis of the drum, said hubs having exteriorly threaded portions, and adjusting nuts engaging said threaded portions of the hubs and held against axial movement, whereby the turning of the nuts is effective in causing axial movement of said hubs and the cams carried thereby to vary the relation between the latter and the extremities of said gripper actuating rods.

3. In a weed puller the combination with a gripper drum having a shaft, heads carried by the shaft, gripper jaws and gripper actuating rods mounted in the heads and operatively related with the jaws, of cams disposed in operative relation with the extremities of said gripper actuating rods and having axially extending hubs provided with longitudinal guiding webs, supporting elements having seats for said longitudinally ribbed hubs, yokes carried by the supporting elements, and adjusting nuts mounted in said yokes and engaging threaded portions of said hubs, said nuts being held against axial movement by said yokes, whereby the revoluble movement thereof causes axial adjustment of the hubs and the cams carried thereby.

In testimony whereof I affix my signature in presence of two witnesses.

ALFREDO L. ROMERO.

Witnesses:
ETHEL STILES,
Mrs. J. STILES.

Copies of this patent may be obtained for five cents each, by addressing the "Commissioner of Patents, Washington, D. C."